Jan. 6, 1942.                 H. F. MILLMANN                 2,268,763
                                MILK CAN COVER
                              Filed July 20, 1939
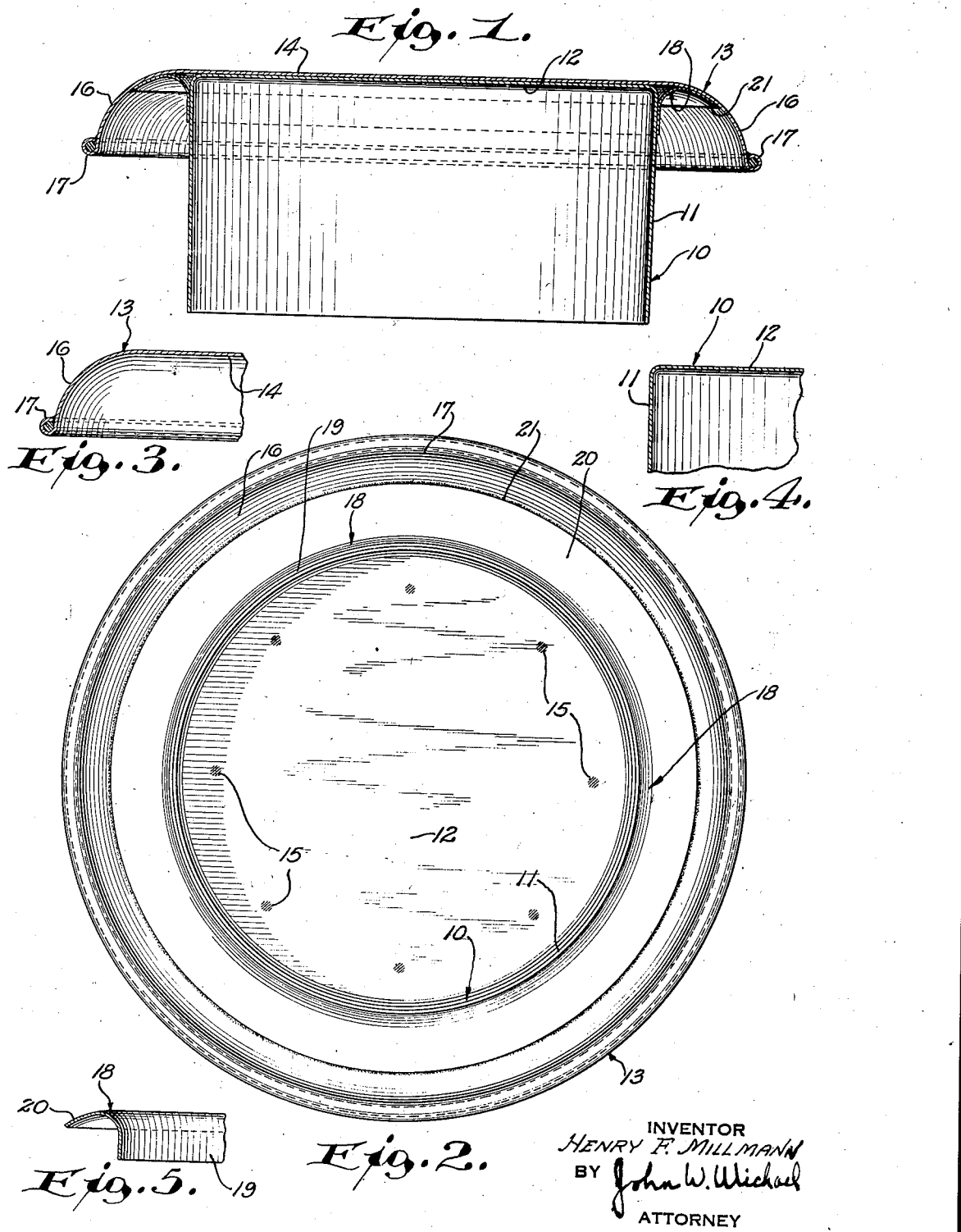
INVENTOR
HENRY F. MILLMANN
BY John W. Michael
ATTORNEY Patented Jan. 6, 1942

2,268,763

UNITED STATES PATENT OFFICE 2,268,763

MILK CAN COVER

Henry F. Millmann, Milwaukee, Wis., assignor to Geuder Paeschke & Frey Co., Milwaukee, Wis., a corporation of Wisconsin Application July 20, 1939, Serial No. 285,467

2 Claims. (Cl. 220—42)

This invention relates to a milk can cover of the type having an umbrella top.

Milk can covers of this type heretofore known and used had the plug-like or shell-like body of the cover secured to the top by solder or the like. The serious disadvantage of this construction resides in the fact that the line of solder is apt to fracture after the cover has been in use for some time. Dairy farmers, and others handling milk cans equipped with this type of cover, frequently have to strike the rim of the cover a forceful blow to dislodge the cover from the neck of the can. Under the influence of such blows or impacts, the solder referred to becomes fatigued, and eventually breaks. Another disadvantage of the old construction is that the line of solder presents a breeding ground for bacteria, and renders the cover more or less unsanitary and difficult to keep clean.

One of the principal objects of the present invention is to provide a milk can cover of this type with a novel and effective means of uniting the body to the top of the cover in such a secure and effective manner that the connection will not break down even under the rough usage to which the cover is subjected in practice.

A further object is to provide a milk can cover having these advantages which eliminates the objectionable soldering, and renders the can cover easy to clean and entirely sanitary.

A further object of the invention is to provide a can cover having these advantages and capacities in which a simple and durable construction is had, reliable and effective in use, easily handled, and comparatively easy and inexpensive to manufacture.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a view in diametrical vertical cross section showing a milk can cover embodying the present invention.

Figure 2 is a view thereof in bottom plan.

Figure 3 is a fragmentary sectional view of a portion of the top of the cover.

Figure 4 is a similar view of a portion of the shell-like or plug-like body of the cover; and Figure 5 is a similar view of the reinforcing and connecting or fillet ring.

Referring to the drawing, the numeral 10 designates the body of the cover, which is shown stamped or drawn from sheet metal, and takes the form of an inverted cup having a cylindrical body portion 11 and an integral upper end 12. The umbrella top of the cover is designated generally at 13, and has a flat top plate 14 engaged flush with the upper end wall 12 of the body of the cover and spot welded thereto, as indicated at 15. The cover 13 has integral with the top 14 a downwardly and outwardly curving rim 16 terminating in a reinforced rolled bead 17. A connecting and reinforcing or fillet ring, designated generally at 18, is provided between the body of the cover and its umbrella top, and is located in the upper portion of the space between the rim 16 and the body of the cover. The ring 18 has a cylindrical body portion 19, which is a press or force fit on the body portion 11, so as to be effectively sealed as well as fixedly secured thereto. It may also be spot welded to the body portion, but usually this is not necessary as a driving or press fit is found satisfactory.

Integral with the cylindrical body portion 19 of the ring is an outwardly and downwardly curving flange 20, which is curved to provide a smoothly curving surface between the body of the cover and the umbrella top and to thereafter fit flush against the downwardly curved rim 16 throughout the annular extent of both members. The outer edge of this flange 20 is then secured and welded at the top by a continuously annular weld 21. This construction provides an exceptionally strong, rigid, and permanent connection between the body and top of the cover, and one that is shock-proof and will stand up under hammer blows struck against the rim of the top. In addition, it provides a construction which is readily cleaned, and which is sanitary, and yet the cover is very simple in its construction and practically arranged, and easy and economical to manufacture.

The invention contemplates not only a cup-shaped body but also an open-ended or suitably flanged shell-like body.

While I have shown and described one construction in which the invention may be advantageously embodied, it is to be understood that the construction shown has been selected merely for the purpose of illustration or example, and that various changes in the size, shape, and arrangement of parts may be made without departing from the spirit of the invention or the scope of the subjoined claims.

I claim:

1. A milk can cover comprising a shell-like body in the form of an inverted cup, an umbrella top having a flat top plate engaged with and welded to the adjacent end wall of the shell-like body and also having a rim curved downwardly and outwardly and terminating in an outwardly rolled bead, and a fillet in the form of a reinforcing and connecting ring disposed in the interior angle between the periphery of the body and the rim of the top and having a cylindrical portion terminating within the confines of said rolled bead and press-fitted on the body and also having a curved flange-like portion providing a smoothly curved surface between the body and the rim and engaged flush against the under side of the rim of the top, and a continuous weld between the margin of said flange-like portion and the under side of the top.

2. A milk can cover comprising a shell-like body, an umbrella top, a reinforcing ring disposed in the interior angle between the body of the shell and the portion of the top that projects therebeyond, said ring having a portion terminating intermediate the top and bottom of said body and press-fitted on and secured to the body, a portion bridging the space between the shell and the under side of the top in a smooth curve and a portion flatly engaged with the under side of the top, and a weld between the margin of said last-named portion and the under side of the top.

HENRY F. MILLMANN.